June 27, 1972 T. C. KELLER ET AL 3,672,735
BEARING HOUSING
Filed Aug. 20, 1970 2 Sheets-Sheet 1

INVENTORS.
THOMAS C. KELLER
ROBERT F. HEGGY
BY Gravely, Lieder & Woodruff
ATTORNEYS.

United States Patent Office

3,672,735
Patented June 27, 1972

3,672,735
BEARING HOUSING
Thomas C. Keller and Robert F. Heggy, Canton, Ohio, assignors to The Timken Company, Canton, Ohio
Filed Aug. 20, 1970, Ser. No. 65,624
Int. Cl. F16c *13/04*
U.S. Cl. 308—180                    10 Claims

ABSTRACT OF THE DISCLOSURE

A bearing housing has a bore sized to receive a double row tapered roller bearing. At the upper portion of the bore arcuate pads are formed on the housing and the curvature of these pads matches the curvature of the bearing cup so that good load distribution is achieved. A narrow retaining rib extends circumferentially along the remaining portion of the cavity and merges at its upper ends into the pads. The rib has an inwardly presented surface which is concentric to the seating surfaces of the pads and is slightly greater in diameter than those pad surfaces. The rib surface is positioned midway between the ends of the bearing and extends completely around the cavity, forming a relief between the pads. A thrust shoulder extends into the cavity beyond the pads and forms an abutment against which the end face of the cup bears. The close proximity of the rib surface to the bearing cup prevents the cup from disengaging and passing beyond the thrust shoulder and further keeps the bearing substantially centered in the housing. Since all the curved surfaces are concentric, they can be machined in one machine set up. The narrowness of the rib does not allow fretting corrosion to hamper disassembly of the bearing from the housing.

BACKGROUND OF THE INVENTION

This invention relates to bearing housings.

To reduce friction and extend the use of their rolling stock, most railroad companies have installed tapered roller bearings in their rail car and locomotive trucks. These bearings have a generally cylindrical shape and fit into housings which in turn fit into rectangular cutouts in the truck frames. In other words, the bearing housings adapt the generally cylindrical bearing to the rectangular frame cutouts. Bearing housings are currently supplied in several different configurations, and the configuration employed depends to a certain extent on the type of truck.

Bed-type trucks, which are the type most commonly used with passenger cars and locomotives, have frames composed of side members tied together by integrally formed cross members so that a fixed spacing is maintained between the side members. The bearing housings, of course, fit into the side members of these frames. Since the spacing between the side members is fixed, each bearing housing used with such a truck needs a minimum of two thrust surfaces—one positioned in the inside of the housing and serving as an abutment for the bearing and the other positioned on the outside of the housing and abutting against the side members of the truck frame for transferring the thrust thereto. Normally, these housings contain full bores into which the bearings are closely fitted and these bores confine the bearing radially. Consequently, housings of the foregoing type are suitable for mounting axle driven accessories such as axle generators or speed recorders.

In housings of the foregoing construction, the size of the full bore is a critical consideration and no one size has been found ideally suited for a specific bearing. For example, the bore must be small enough to establish good load distribution across the upper portion of the bearing cup, or in other words, prevent the load from concentrating along a thin line extending axially across the top of the bearing cup. However, a housing bore sized to provide good load distribution is usually too small for assembly purposes, in that the bearing cup does not easily slide into such a bore. On the other hand, when the bore is made large enough to afford easy assembly, poor load distribution occurs which causes high contact stress along the bearing raceways and resultant fatigue. Moreover, fretting corrosion occurs, and in time this type of corrosion tends to bond the cup and housing together, making disassembly of the bearing from the housing extremely difficult.

To overcome the foregoing problems, full bores were discarded and bearing housings having bores formed from two off center arcuate surfaces were developed. In each construction of this nature the upper portion of the bore is machined to conform to the curvature of the cup so as to provide good load distribution. The remaining portion, on the other hand, is machined somewhat larger about a centerline positioned downwardly from the centerline about which the upper portion is machined so that effects of fretting corrosion are minimized and the bearing may be easily installed in or withdrawn from the housing. Machining operations conducted on two centers, however, are time consuming and difficult to set up. Hence, they add appreciably to the cost of the housing.

SUMMARY OF THE INVENTION

One of the principal objects of the present invention is to provide a bearing housing which provides excellent load distribution in the bearing, yet is easily separated from the bearing so that the bearing is easily installed in and withdrawn from the housing. Another object is to provide a bearing housing which minimizes the effects of fretting corrosion. A further object is to provide a bearing housing on which axle driven accessories may be installed. An additional object is to provide a bearing housing which is ideally suited for use in bed-type railway trucks. Still another object is to provide a bearing housing, the cavity or bore of which is machined on one center, thereby making the housing economical to produce. These and other objects and advantages will become apparent hereinafter.

The present invention is embodied in a bearing housing having a cavity sized to receive a bearing. A pad, against which the outer race of the bearing seats, is formed in the housing. A rib is also formed in the housing, and that rib prevents the outer race from departing a substantial distance from the pad. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
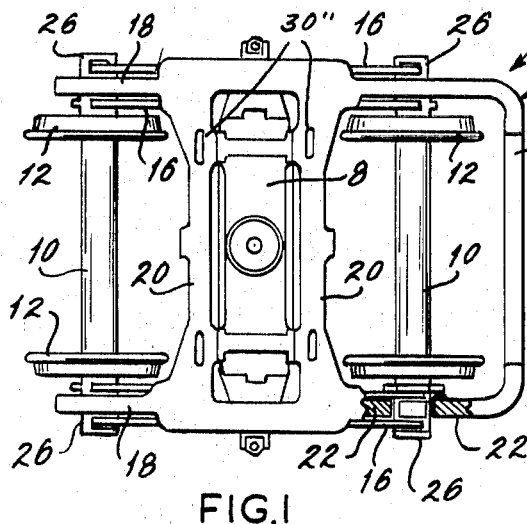
FIG. 1 is a plan view of a railway truck provided with bearing housings constructed in accordance with and embodying the present invention.
Figure 2:
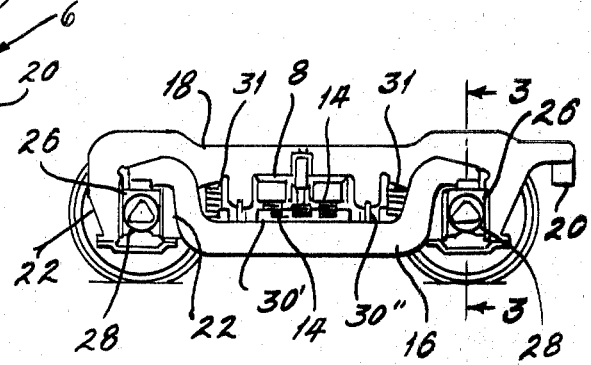
FIG. 2 is a side elevational view of the truck.
Figure 3:
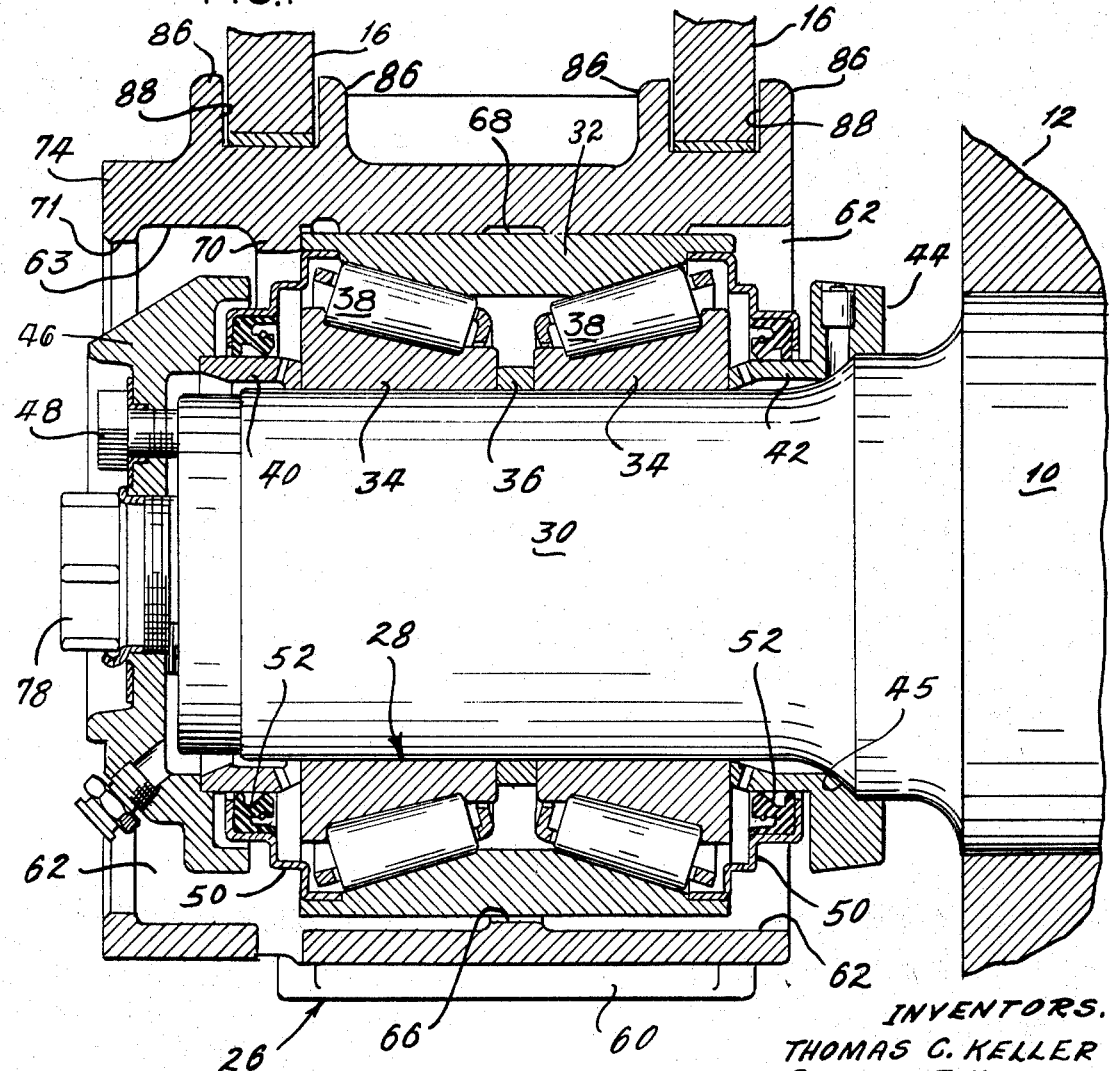
FIG. 3 is a fragmentary sectional view taken along line 3—3 of FIG. 2.

Referring now to the drawings, 2 designates a bed-type railway truck (FIGS. 1 and 2) including a frame 6, a bolster 8, axles 10, wheels 12 on the axles 10, spring sets 14, and equalizer 16. The frame 6 is cast as an integral unit and comprises a pair of side members 18 on each side of the truck 2 and cross members 20 extending between the side members 18 so that the spacing between the side members 18 remains fixed. At their ends the side members 18 of the frame 6 have downwardly projecting jaws 22 which define rectangular cutouts, and positioned in these cutouts are bearing housings 26. Fitted into the housings 26 are double row tapered roller bearings 28 (FIG. 3) which fit around reduced ends 30 on the axles 10 and thereby form journals for the axles 10. The equalizers 16 inwardly from their ends turn upwardly and then horizontally again, and at their ends they rest upon the bearing housings 26 (FIG. 2). The spring sets 14 are interposed between the bolster 8 and a spring plank 30' which is suspended from the two centrally disposed cross members 20 of the truck frame 6 by means of spring plank hangers 30''. To maintain the frame 6 in an elevated position, springs 31 are interposed between it and the equalizers 16. Aside from the construction of the bearing housings 26, which will subsequently be described in greater detail, the foregoing truck 2 is conventional.

The bearings 28 are also conventional, and each includes an outer race or, more specifically, a double cup 32 having a cylindrical outer surface, a pair of cones 34 separated by a spacer 36, and a plurality of rollers 38 arranged in two rows and engaging the opposed raceways on the cup 32 and cones 34. The cones 34 are press fitted over the reduced end 30 of the axle 10 and are positioned between an outboard seal wear ring 40 and an inboard seal wear ring portion 42 which forms an integral part of a cone backing ring 44. The cone backing ring 44, in turn, bears against an axle fillet 45 at the inner end of the reduced end portion 30 on the axle 10. The outboard seal wear ring 40, on the other hand, bears against an axle end cap 46 which is secured across the end face of the reduced end portion 30 by means of cap screws 48. The cap screws 48 urge the axle end cap 46 inwardly and in effect compress the outboard seal wear ring 40, the cones 34, the spacer 36, and the cone backing ring 44 against the axle fillet 45. Thus, the cones 34 are positioned securely between the axle end cap 46 and the cone backing ring 44. Pressed into both ends of the cup 32 are seal cases 50 having seals 52 attached to them, and those seals contact the seal wear ring 40 and the wear ring portion 42 of the cone backing ring 44.

Figure 4:
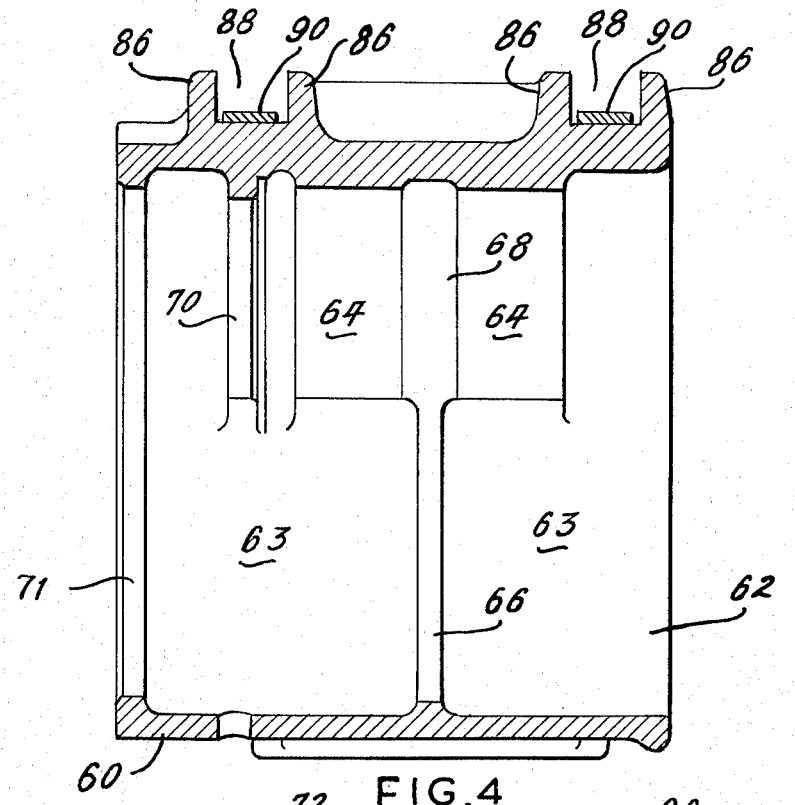
FIG. 4 is a sectional view similar to FIG. 3, but without the bearing in the housing.
Figure 5:
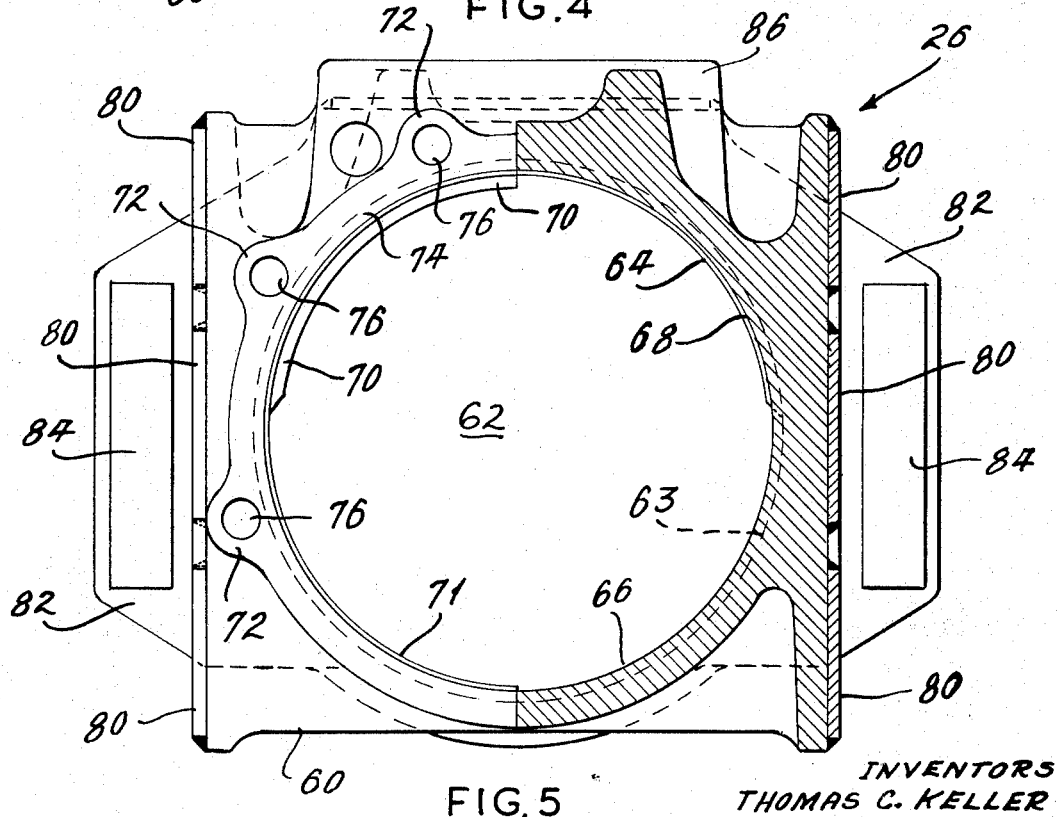
FIG. 5 is an end view of the housing with a portion of the housing being in section, the section line extending through the retaining rib and pad relief.

Each bearing housing 26 (FIGS. 3–5) includes a cast body 60 having a cavity or bore 62 therein. The bore 62 extends completely through the body 60 and for the most part is defined by a generally cylindrical unfinished surface 63, the diameter of which is somewhat greater than the diameter of the external cylindrical surface on the bearing cup 32. In the case of railway bearings this difference in diameter amounts to approximately ¾ inch. The surface 63 is interrupted by a pair of arcuate pads 64 which are cast integral with the body 60 and extend circumferentially approximately 83° on each side of the vertical centerline of the housing 26 (FIGS. 4 and 5). Thus, the chord formed by the ends of the pads 64 traverses the bore 62 above the horizontal centerline of the housing 26, and in railroad bearings this chord is located approximately one inch above the centerline of the bore 62. The inwardly presented surfaces of the pads 64 are machined concentric to the surface 63 and to a curvature which conforms to the curvature of the external surface on the bearing cup 32. Ideally, the inwardly presented surfaces of the pads 64 are machined to the same radius as the external surface of the cup 32, but slight variances in either direction are acceptable.

The surface 63 is also interrupted by a narrow retaining rib 66 (FIGS. 3–5) which is presented in the approximate mid-section of the body 60 and is likewise cast integral thereto. The rib 66 extends circumferentially through the lower portion of the bore 62 and at its upper ends merges into the pads 64. The inwardly presented surface of the rib 66 is machined generally concentric to the surface 63, and is also machined concentric to the inwardly presented faces of the pads 64. In other words, the pads 64 and rib 66 are machined about the same center. The inwardly presented surface of the retaining rib 66, however, is machined to a diameter which is somewhat greater than the diameter of the machined surfaces on the pads 64, and that machined surface continues through the pads 64 as a pad relief 68 separating the individual pads 64. In other words, since the diameter of the inwardly presented face of the retaining rib 66 is greater than the diameter of the arcuate faces on the pads 64, the inwardly presented surface of the retaining rib 66 continues completely around the bore 62 and in the vicinity of the pads 64 forms a groove or pad relief 68 which is presented between the pads 64. In the case of railway bearings, the difference between the diameters of the inwardly presented faces on the pads 64 and the surface on the retaining rib amounts to approximately ⅛ inch so that the depth of the pad relief 68 is approximately 1/16 inch.

Beyond the outer of the two pads 64, a thrust shoulder 70 (FIGS. 3–5) is also formed integral with the body 60, and that shoulder projects radially inwardly beyond the inwardly presented faces of the pads 64. Thus, the inner diameter of the thrust shoulder 70 is even smaller than the diameter of the pads 64. The arcuate length of the shoulder 70 may vary from approximately the arcuate length of the pads 64 to a full 360°. The side face of the shoulder 70 which is presented toward the pads 64 is machined perpendicular to the axial centerline of the bore 62 so as to form a squared off abutment in the housing bore 62.

The tapered roller bearing 28 fits within the bore 62 (FIG. 3) from the inboard end of the housing 26, and as it is advanced into the bore 62 its cup 32 easily clears both the pads 64 and the rib 66, inasmuch as both the unfinished surface 63 and the rib 66 are larger in diameter than the cup 32.

Since the thrust shoulder 70 is considerably smaller in diameter than either of the pads 64 or the retaining rib 66, the end face of the cup 32 will eventually abut against the squared off face on the thrust shoulder 70. Indeed, the shoulder 70 extends far enough into the bore 62 to prevent passage of the cup 32 through the housing 26, irrespective of how the cup 32 is canted therein. When the end face of the cup 32 is positioned against the thrust shoulder 70, one row of tapered rollers 38 will be positioned directly beneath each pad 64, while the spacer 36 located between the cones 34 will be positioned directly inwardly from the pad relief 68 and the retaining rib 66. Thus, aside from retaining the bearing 28 in the housing 26, the thrust shoulder 70 further serves to properly position the bearing 28 in the housing 26.

The housing 26 projects axially outward beyond the thrust shoulder 70, and is provided with a circular end rib 71 which is machined concentric to the shoulder 70, pads 64 and rib 66 and forms a pilot bore leading into the main bore 62. At its end the housing body 60 may be provided with integrally cast mounting lugs 72 (FIG. 5) and a squared off end face 74 which extends across those lugs 72. The mounting lugs 72 provide a convenient mount for axle driven accessories such as generators, alternators, or speed recorders, and these accessories are usually secured in place by cap screws which thread into tapped holes 76 formed in the lugs 72. These accessories usually have a splined drive shaft which fits into an adapter 78 (FIG. 3) mounted at the center of the end cap 46. The axle driven accessories do no form part of the present invention and will therefore not be described in further detail. In general, the disposition of the outboard end of the housing is determined by the type, width, and design of the truck 2.

The housing 26 also extends in the opposite axial direction beyond the inboard end face on the cup 32, the length of the housing 26 being determined by the construction of the frame 6 and the disposition of the equalizers 16.

Externally, the housing body 60 is provided with planar and parallel side faces to which hardened wear plates 80 (FIG. 5) are welded, and the outwardly presented friction surfaces on the wear plates 80 at each side of the housing 26 are spaced apart a distance slightly less than the distance between the jaws 22 located at the end of the side member 18 on the frame 6. As previously noted the housing 26 fits into the rectangular cutouts between the jaws 22 (FIG. 1), and when so installed it is free to move upwardly and downwardly a limited distance, in which case its wear plates 80 will slide against the friction surfaces on the jaws 22.

At the inner end of the housing 26, the housing body 60 has thrust lugs 82 cast integral with it and those lugs project laterally beyond the wear plates 80. The thrust lugs 82 also have hardened wear plates 84 (FIG. 5) welded to them, and those wear plates bear against the inwardly presented surfaces on the frame side members 18 at the jaws 22 thereon.

Cast integral with and forming part of the top of the housing body 60 are lugs 86 (FIGS. 3 and 4) which are arranged in two pairs to form a pair of transversely extending equalizer pockets or grooves 88 which open upwardly. At the base of each equalizer pockets 88 a hardened wear plate 90 is welded to the housing body 60, and the horizontal ends of the equalizers 16 rest upon the wear plates 90 within these grooves 88. Thus, the lugs 86 restrict movement of the equalizers 16 transversely of the truck 2.

The tapered roller bearing 28 is positioned within the housing 26 with its cup 32 seated against the pads 64 (FIG. 3) and the end face of the cup 32 positioned against the squared off face on the thrust shoulder 70. In that position, each row of tapered rollers 38 will be disposed directly beneath one of the arcuate pads 64, while the inwardly presented surface of the retaining rib 66 and pad relief 68 will encircle the cup 32 directly outwardly from the cone spacer 36. The foregoing surface, however, normally does not engage the cup 32. Nevertheless, the clearance between the cup 32 and rib 66 is close enough to prevent the cup 32 from dropping below and disengaging the thrust shoulder 70.

In use the weight of the rail car is applied to the bearing housings 26 through the ends of the equalizers 16 which bear against the wear plates 90 in the upwardly opening equalizer pockets 88. The load applied to each housing 26 is transferred to the cup 32 of the bearing 28 therein through the arcuate pads 64. Since the curvature of the arcuate surfaces on the pads 64 conforms to the curvature of external cylindrical surface of the cup 32, the load is transferred across the entire area of engagement which constitutes almost the entire upper half of the cup 32. In other words, good load distribution is achieved. This load distribution furthermore causes the load to be distributed through numerous tapered rollers 38 at the top of the cup 32. Thus, the load does not concentrate along a narrow line extending axially across the top of the cup 32, nor is it transferred to the cones 34 through just a few rollers 38 located near that narrow line as is true of bearings which are loosely fitted in enlarged housing bores. The improved load distribution reduces contact stress and resultant metal fatigue along the raceways of the cup 32 and cones 34, and extends the life of the bearing 28.

Should the axle 10 be thrust toward the housing 26 (left in FIG. 3), the thrust will be transferred through the bearing 28, inasmuch as tapered roller bearings transmit both radial and axial loads, and will be applied to the housing 26 at the abutment of the cup 32 and the thrust shoulder 70. The thrust is transmitted to the truck frame 6 through the lateral lugs 82 which bear against the jaws 22 on the side members 18 of that frame. When the axle 10 is thrust in the opposite direction, the thrust load is carried in the same manner by the bearing 28 and the housing 26 located on the opposite side of the truck 2. Since the cross members 20 tie the side members 18 of the truck frame 6 together only one thrust shoulder 70 and set of lateral lugs 82 are required for each housing 26 to accommodate all thrust loads applied to the axle 10.

While some fretting corrosion may occur along the retaining rib 66, the extremely narrow width of the rib 66 precludes any fretting corrosion which does occur from creating a problem in disassembling the bearing 28 from its housing 26.

Since the inwardly presented arcuate surfaces of the pads 64, the continuous surface of the rib 66 and the relief 68 and the surfaces of the shoulder 70 and rib 71 are all concentric about the axis of the bore 62, all boring and other machining to form the bore 62 and pilot bore is done about one center. This enables the machining to be accomplished in one machine set up.

The drawings and foregoing written disclosure illustrate and describe a typical application and may have variations. Indeed, the exterior design may vary to suit various truck designs and individual rail company practices. For example, flame or induction hardened wear surfaces may be used in place of the wear plates 80, 84 and 90. Also the top of the housing body 60 may be cast to accept coil or leaf springs instead of the equalizers 16. Moreover, the housing length may be different from that illustrated, and that length is determined by the construction of the frame and cooperating suspension devices. The foregoing are just a few of the possible variations in exterior design.

This invention is intended to cover all changes and modifications of the example of the invention herein chosen for purposes of the disclosure which do not constitute departures from the spirit and scope of the invention.

What is claimed is:

1. A housing for a bearing comprising: a body having a cavity sized to receive a bearing having a race provided with an external surface of circular cross-section, at least one pad located on the body and having a curved surface facing the cavity, the curved surface extending circumferentially along and over only a portion of the cavity, the curvature of the curved surface substantially matching the curvature of the external surface on the outer race of the bearing so that the outer race will seat against the curved surface of the pad, and a rib on the body extending circumferentially along the portion of the cavity located opposite to the pad, the rib having a curved surface which faces the cavity and is concentric to and has a radius greater than the curved surface on the pad, the curved surface of the rib being axially offset from the curved surface of the pad, the curved surface of the rib further continuing around and encircling the cavity adjacent to the pad so as to form a relief adjacent to the pad.

2. A housing according to claim 1 and further characterized by a thrust shoulder on the body, the thrust shoulder being axially offset from the pad and projecting further inwardly than the pad, whereby the shoulder forms an abutment against which the end of the bearing race bears so that thrust loads are transmitted from the bearing to the housing.

3. A housing according to claim 1 wherein the cavity is generally circular in cross-sectional shape; wherein the pads extend less than 180° around the cavity; and wherein the rib at its ends merges into the pads, whereby the rib extends circumferentially around the remaining portion of the cavity.

4. A housing according to claim 3 wherein the radius of the inwardly facing surface on the rib is approximately 1/16 inch greater than the radius of the inwardly facing surfaces on the pads.

5. A housing according to claim 4 wherein the radius of the circular cavity is approximately 3/8 inch greater than the radius of the inwardly facing surfaces on the pads.

6. In a railway truck having a bed-type frame and wheel axles journaled in tapered roller bearings having cups provided with cylindrical outer surfaces; an improved bearing housing for fitting each bearing to the truck, said housing comprising a body having a cavity sized to receive the bearing, a pair of pads formed integral with the body and having curved surfaces facing the cavity, the curved surfaces of the pad extending for less than 180° only along the upper portion of the cavity, the curvature of the curved surfaces substantially matching the curvature of the cylindrical surface on the bearing cup, whereby the pads form a seat for the bearing and enable radial loads to be transferred to the bearing, a relatively narrow rib formed integral with the body and extending through the lower portion of the cavity, the rib merging at its ends into the pads and having an inwardly facing curved surface, the inwardly facing curved surface on the rib continuing completely around the cavity and forming a relief between the pads, and a thrust shoulder formed integral with the body and being offset axially from the pads, the shoulder projecting inwardly beyond the one end surface of the cup so as to form an abutment against which the end of the cup bears, the rib being sized to limit radial movement of the cup in the cavity and to prevent the cup from passing beyond the thrust shoulder.

7. The structure according to claim 6 wherein the thrust shoulder extends along the upper portion of the cavity outwardly from the pads and positions the rollers of the tapered roller bearing directly beneath the pads.

8. A housing for a bearing; said housing comprising: a body having a cavity sized to receive a bearing having a race provided with an external surface of circular cross-section, two pads located on the body and having curved surfaces facing the cavity, the curved surfaces extending circumferentially along and over only a portion of the cavity, the curvature of the curved surfaces substantially matching the curvature of the external surface on the outer race of the bearing so that the outer race will seat against the curved surfaces of the pads, and a rib on the body and extending circumferentially along the portion of the cavity located opposite to the pad, the rib having a curved surface which faces the cavity; the curved surface of the rib being concentric to and having a radius greater than the curved surface on the pad, the curved surface of the rib further being continuous around the cavity and passing between the pads so as to form a relief which separates the pads.

9. A housing according to claim 8 wherein the bearing is a double row tapered roller bearing; and wherein a different row is aligned with and positioned inwardly from each pad.

10. A housing for a cartridge-type bearing, said housing comprising a body having a cavity therein which is sized to receive a cartridge-type bearing having a unitary outer race provided with a cylindrical outer surface and at least two axially spaced rows of rolling elements engaged with and encircled by the outer race; a thrust shoulder on the body and serving as an abutment for the one end of the bearing outer race so as to transmit thrust loading between the bearing and housing and to axially position the bearing within the housing; a pair of load bearing pads on the housing body for engaging the outer race of the bearing in order to transmit radial loading between the housing and the bearing, the pads being separated by a relief and positioned to overlie the two rows of rolling elements when the end of the outer race abuts the thrust shoulder, the pads having arcuate surfaces presented inwardly toward the interior of the cavity for engaging the cylindrical outer surface of the outer bearing race, the arcuate surfaces of the two pads being in substantially the same circumferential position within the cavity, the arcuate length of the pads being less than 180° and the radius of the pads being substantially equal to the radius of the outer cylindrical surface on the bearing outer race whereby the arcuate surfaces engage the outer race along substantially the entire surfaces area of those pad surfaces when radial loads are transmitted through the pads; and a retaining projection on the housing body and projecting into the cavity opposite to the relief between the pads, the projection having an arcuate surface presented toward the interior of the cavity, the arcuate surface on the projection being concentric with the arcuate surfaces on the pads and further being of a slightly greater radius than the radius of the arcuate pads, the arcuate surface of the projection being axially offset from the arcuate surfaces of the pads so that all the arcuate surfaces may be machined about the same center.

References Cited
UNITED STATES PATENTS

| | | | |
|---|---|---|---|
| 1,468,134 | 9/1923 | Brunner et al. | 308—180 |
| 1,999,710 | 4/1935 | Weckstein | 308—180 |
| 2,045,005 | 6/1936 | Whitacre | 308—180 |

MARTIN P. SCHWADRON, Primary Examiner

F. SUSKO, Assistant Examiner